(12) United States Patent
Lee et al.

(10) Patent No.: US 10,764,562 B2
(45) Date of Patent: Sep. 1, 2020

(54) DEPTH GENERATION SYSTEM WITH ADJUSTABLE LIGHT INTENSITY

(71) Applicant: eYs3D Microelectronics, Co., Taipei (TW)

(72) Inventors: Chi-Feng Lee, Hsinchu County (TW); Hsueh-Jung Lu, New Taipei (TW)

(73) Assignee: eYs3D Microelectronics, Co., Taipei (TW)

(*) Notice: Subject to any disclaimer, the term of this patent is extended or adjusted under 35 U.S.C. 154(b) by 0 days.

(21) Appl. No.: 16/258,706

(22) Filed: Jan. 28, 2019

(65) Prior Publication Data

US 2019/0238824 A1 Aug. 1, 2019

Related U.S. Application Data

(60) Provisional application No. 62/681,683, filed on Jun. 7, 2018, provisional application No. 62/622,962, filed on Jan. 28, 2018.

(51) Int. Cl.

| | |
|---|---|
| *H04N 13/271* | (2018.01) |
| *G06T 7/521* | (2017.01) |
| *G06T 7/593* | (2017.01) |
| *H04N 5/232* | (2006.01) |
| *H04N 5/235* | (2006.01) |

(Continued)

(52) U.S. Cl.
CPC ....... *H04N 13/271* (2018.05); *G01B 11/2513* (2013.01); *G01S 17/89* (2013.01); *G06T 7/521* (2017.01); *G06T 7/593* (2017.01); *H04N 5/2354* (2013.01); *H04N 5/23206* (2013.01);
(Continued)

(58) Field of Classification Search
CPC ............ G06T 7/593; G06T 7/521; G06T 2207/10012; G01B 11/2513; G01S 17/89; H04N 13/271; H04N 5/23206; H04N 5/2354; H04N 2213/007
See application file for complete search history.

(56) References Cited

U.S. PATENT DOCUMENTS

| 6,137,491 A | 10/2000 | Szeliski |
|---|---|---|
| 2010/0194886 A1 | 8/2010 | Asari |

(Continued)

FOREIGN PATENT DOCUMENTS

| CN | 103729883 A | 4/2014 |
|---|---|---|
| CN | 106416240 A | 2/2017 |

(Continued)

*Primary Examiner* — Neil R Mikeska
(74) *Attorney, Agent, or Firm* — Winston Hsu

(57) ABSTRACT

A depth generation system with adjustable light intensity includes at least one light source, at least one image capturer, a depth map generator, and a controller. Each light source of the at least one light source is used for generating emitted light. Each image capturer of the at least one image capturer is used for capturing an image including at least one reflected light generated by at least one object reflecting the emitted light. The depth map generator is coupled to the each image capturer for generating a corresponding depth map according to the image or the at least one reflected light. The controller is coupled to the depth map generator for determining whether to adjust intensity of the emitted light according to information of the corresponding depth map or intensity of the at least one reflected light.

20 Claims, 16 Drawing Sheets

(51) Int. Cl.
*G01S 17/89* (2020.01)
*G01B 11/25* (2006.01)
(52) U.S. Cl.
CPC .............. *G06T 2207/10012* (2013.01); *H04N 2213/007* (2013.01)

(56) References Cited

U.S. PATENT DOCUMENTS

| | | |
|---|---|---|
| 2010/0295948 A1 | 11/2010 | Xie |
| 2011/0317988 A1* | 12/2011 | Lee .......................... G03B 7/16 396/61 |
| 2012/0274739 A1 | 11/2012 | Li |
| 2013/0077882 A1 | 3/2013 | Venkataraman |
| 2014/0225985 A1 | 8/2014 | Klusza |
| 2015/0213607 A1 | 7/2015 | Jeong |
| 2015/0314443 A1 | 11/2015 | Yu |
| 2016/0029009 A1* | 1/2016 | Lu ...................... G01B 11/2545 348/47 |
| 2016/0291594 A1* | 10/2016 | Zhao ........................ G01S 17/36 |
| 2017/0010452 A1* | 1/2017 | Patzwald ................. G01C 3/08 |
| 2017/0161561 A1 | 6/2017 | Marty |
| 2018/0061021 A1 | 3/2018 | Lin |
| 2018/0278916 A1 | 9/2018 | Kim |
| 2019/0259178 A1 | 8/2019 | Hafner |

FOREIGN PATENT DOCUMENTS

| | | |
|---|---|---|
| CN | 106576160 A | 4/2017 |
| CN | 107167996 A | 9/2017 |
| TW | 201447228 A | 12/2014 |
| TW | 201733350 A | 9/2017 |

* cited by examiner

DEPTH GENERATION SYSTEM WITH ADJUSTABLE LIGHT INTENSITY

CROSS REFERENCE TO RELATED APPLICATION

This application claims the benefit of U.S. Provisional Application No. 62/622,962, filed on Jan. 28, 2018 and entitled "Light Control System," and the benefit of U.S. Provisional Application No. 62/681,683, filed on Jun. 7, 2018 and entitled "IMAGE PROCESSING METHOD AND SELF-CALIBRATION/LIGHT CONTROL METHOD FOR CAMERA DEVICE," the contents of which are incorporated herein by reference.

BACKGROUND OF THE INVENTION

1. Field of the Invention

The present invention relates to a depth generation system with adjustable light intensity, and particularly to a depth generation system that can utilize a controller to dynamically adjust intensity of emitted light generated by the depth generation system according to at least one of at least one depth of a depth map including at least one object (wherein the at least one depth corresponds to the at least one object), a proportion corresponding to invalid data in the depth map, intensity of at least one reflected light generated by the at least one object, and intensity of ambient light of an environment which the depth generation system is located at.

2. Description of the Prior Art

Although structured light can increase quality of a depth map, usually emitting the structured light needs greater power to increase an operating distance corresponding to the structured light, wherein the prior art specifies that luminance of the structured light in a maximum operating distance does not damage eyes of a user. Although the luminance of the structured light in the maximum operating distance does not damage the eyes of the user, the eyes of the user may be damaged when the user is located within the maximum operating distance under the same power for making the luminance of the structured light in the maximum operating distance not damage the eyes of the user. Because video and audio interactive devices that can interact with the user are gradually popular, how to make intensity of the structured light be changeable to prevent the eyes of the user from being damaged becomes an important issue.

SUMMARY OF THE INVENTION

An embodiment of the present invention provides a depth generation system with adjustable light intensity. The depth generation system includes at least one light source, at least one image capturer, a depth map generator, and a controller. Each light source of the at least one light source is used for generating emitted light. Each image capturer of the at least one image capturer is used for capturing an image comprising at least one reflected light generated by at least one object reflecting the emitted light. The depth map generator is coupled to the each image capturer for generating a corresponding depth map according to the image or the at least one reflected light. The controller is coupled to the depth map generator for determining whether to adjust intensity of the emitted light according to information of the corresponding depth map or intensity of the at least one reflected light.

An embodiment of the present invention provides a depth generation system with adjustable light intensity. The depth generation system includes at least one light source, at least one image capturer, a wireless communication module, a depth map generator, and a controller. Each light source of the at least one light source is used for generating emitted light. Each image capturer of the at least one image capturer is used for capturing an image comprising at least one reflected light generated by at least one object reflecting the emitted light. The depth map generator is coupled to the each image capturer for generating a corresponding depth map according to the image or the at least one reflected light. The controller is coupled to the depth map generator, wherein the controller determines at least one of an emitting time, a modulation frequency, a phase, and a pattern of the emitted light accordingly after the controller communicates with another depth generation system through the wireless communication module and a predetermined communication protocol.

The present invention provides a depth generation system with adjustable light intensity. The depth generation system utilizes a controller to dynamically adjust intensity of emitted light generated by the depth generation system according to at least one of at least one depth of a depth map corresponding to at least one object, a proportion of invalid data of the depth map, intensity of at least one reflected light generated by the at least one object, and intensity of ambient light of an environment which the depth generation system is located at, compared to the prior art, the present invention can effectively prevent eyes of a user from being damaged, increase quality of the depth map, and reduce power consumption of the depth generation system.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
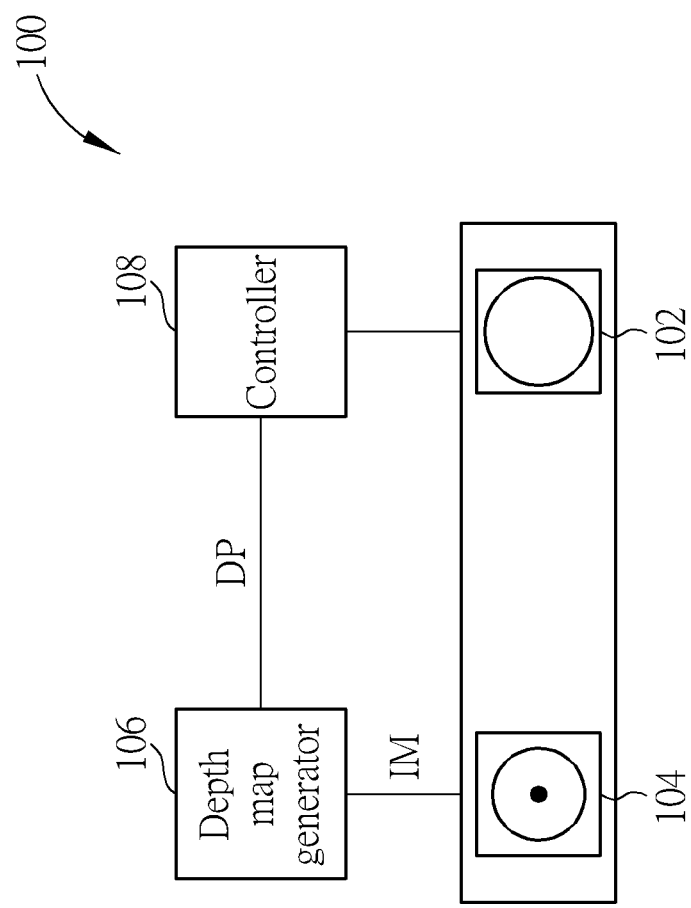
FIG. 1 is a diagram illustrating a depth generation system with adjustable light intensity according to a first embodiment of the present invention.
Figure 2:
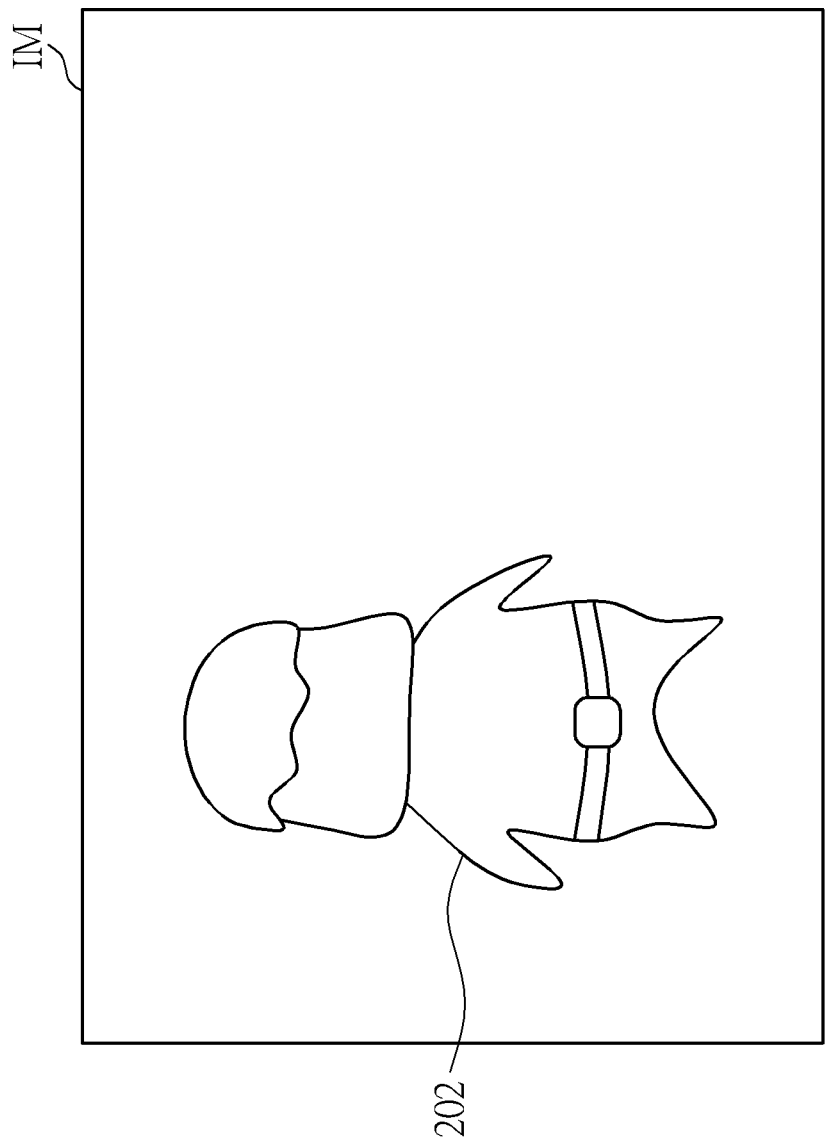
FIG. 2 is a diagram illustrating an image.

Please refer to FIG. 1. FIG. 1 is a diagram illustrating a depth generation system 100 with adjustable light intensity according to a first embodiment of the present invention. As shown in FIG. 1, the depth generation system 100 includes a light source 102, an image capturer 104, a depth map generator 106, and a controller 108, wherein the depth map generator 106 is coupled to the image capturer 104 and the controller 108, and the controller 108 is further coupled to the light source 102. In addition, the present invention is not limited to the depth generation system 100 only including the light source 102 and the image capturer 104. That is, the depth generation system 100 can include a plurality of light sources and a plurality of image capturers. As shown in FIG. 1, the light source 102 is used for generating emitted light, wherein the emitted light is structured light, and the light source 102 can be a laser light source, a light emitting diode light source, a projector. In addition, taking a wavelength range of the light source 102 as an example, the light source 102 can be an infrared light source, or other type light sources (e.g. the light source 102 can be a visible light source). The image capturer 104 is used for capturing an image IM (as shown in FIG. 2) including at least one reflected light generated by at least one object reflecting the emitted light, wherein for simplifying FIG. 2, the image IM in FIG. 2 only includes an object 202. But, the present invention is not limited to the image IM only including the object 202. In addition, one of ordinary skill in the art should well know that the image capturer 104 at least includes a lens and an image sensor (e.g. a charge-coupled equipment (CCD) image sensor or a complementary metal-oxide-semiconductor image sensor).

Figure 3A:
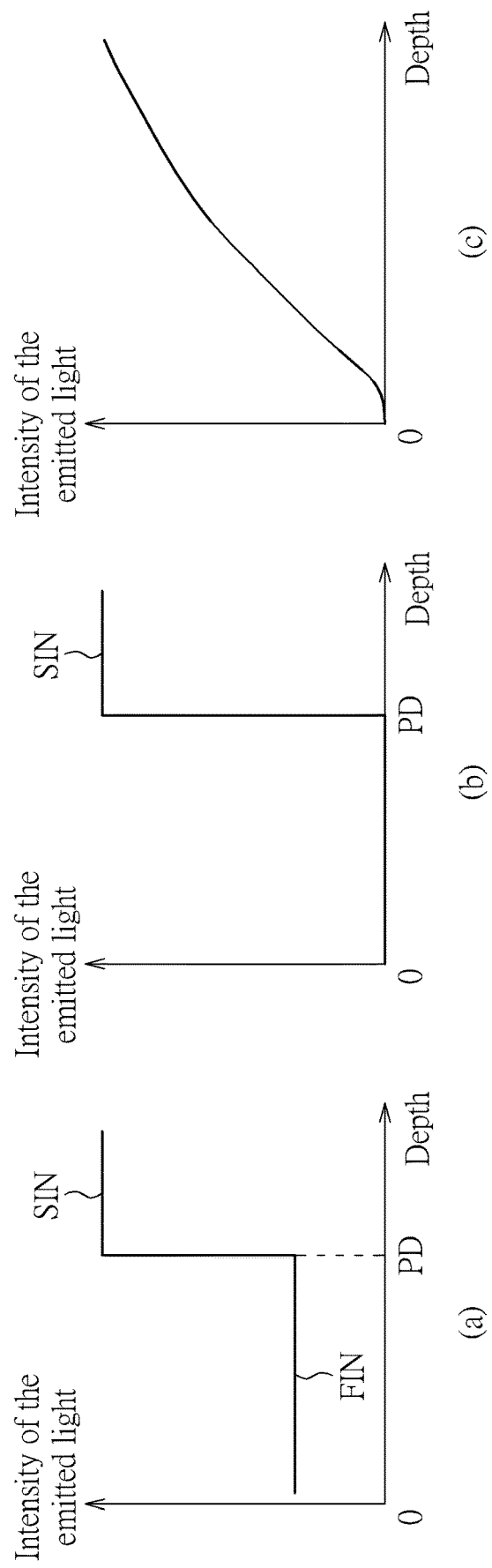
FIG. 3A is a diagram illustrating the controller controlling the intensity of the emitted light according to the depth corresponding to the object.

After the image capturer 104 generates the image IM, the depth map generator 106 can generate a depth map DP corresponding to the image IM according to the image IM. After the depth map generator 106 generates the depth map DP, the controller 108 can determine whether to adjust intensity of the emitted light according to information of the depth map DP. In one embodiment of the present invention, the controller 108 can determine whether to adjust the intensity of the emitted light according to a depth of the depth map DP corresponding to the object 202, wherein the depth corresponding to the object 202 is changed with a distance corresponding to the object 202. Therefore, as shown in FIG. 3A(a), when the depth corresponding to the object 202 is greater than a predetermined depth PD and the intensity of the emitted light is first intensity FIN, the controller 108 adjusts the intensity of the emitted light from the first intensity FIN to second intensity SIN, and the second intensity SIN is greater than the first intensity FIN. That is, when the depth corresponding to the object 202 is greater than the predetermined depth PD and the intensity of the emitted light is the second intensity SIN, the controller 108 maintains the intensity of the emitted light at the second intensity SIN. In addition, when the depth corresponding to the object 202 is less than the predetermined depth PD, operational principles of the controller 108 can be referred to FIG. 3A(a), so further description thereof is omitted for simplicity.

In addition, in another embodiment of the present invention, as shown in FIG. 3A(b), when the depth corresponding to the object 202 is greater than the predetermined depth PD and the light source 102 is turned off, the controller 108 turns on the light source 102 and makes the intensity of the emitted light be at the second intensity SIN. That is, when the depth corresponding to the object 202 is greater than the predetermined depth PD and the light source 102 is turned on (meanwhile, the intensity of the emitted light is the second intensity SIN), the controller 108 maintains the intensity of the emitted light at the second intensity SIN. In addition, as shown in FIG. 3A(b), when the depth corresponding to the object 202 is less than the predetermined depth PD and the light source 102 is turned off, the controller 108 maintains the light source 102 off. That is, when the depth corresponding to the object 202 is less than the predetermined depth PD and the light source 102 is turned on (meanwhile, the intensity of the emitted light is the second intensity SIN), the controller 108 turns off the light source 102. In addition, after a predetermined time when the controller 108 turns off the light source 102, the controller 108 can turn on the light source 102 again and makes the intensity of the emitted light be the second intensity SIN, if the depth corresponding to the object 202 is greater than the predetermined depth PD due to movement of the object 202, the controller 108 maintains the light source 102 on, and if the depth corresponding to the object 202 is less than the predetermined depth PD due to movement of the object 202, the controller 108 turns off the light source 102 again. In addition, in another embodiment of the present invention, as shown in FIG. 3A(c), after the controller 108 turns on the light source 102, the controller 108 gradually increases the intensity of the emitted light with increase of the depth corresponding to the object 202 in multiple steps, and gradually decreases the intensity of the emitted light in multiple steps, even if turns off the light source 102 with decrease of the depth corresponding to the object 202. In addition, after the predetermined time when the controller 108 turns off the light source 102, the controller 108 can turn on the light source 102 again and makes the intensity of the emitted light be predetermined intensity. After the light source 102 is turned on, the controller 108 adjusts the intensity of the emitted light again according to the depth corresponding to the object 202. Therefore, as shown in FIG.

Figure 3B:
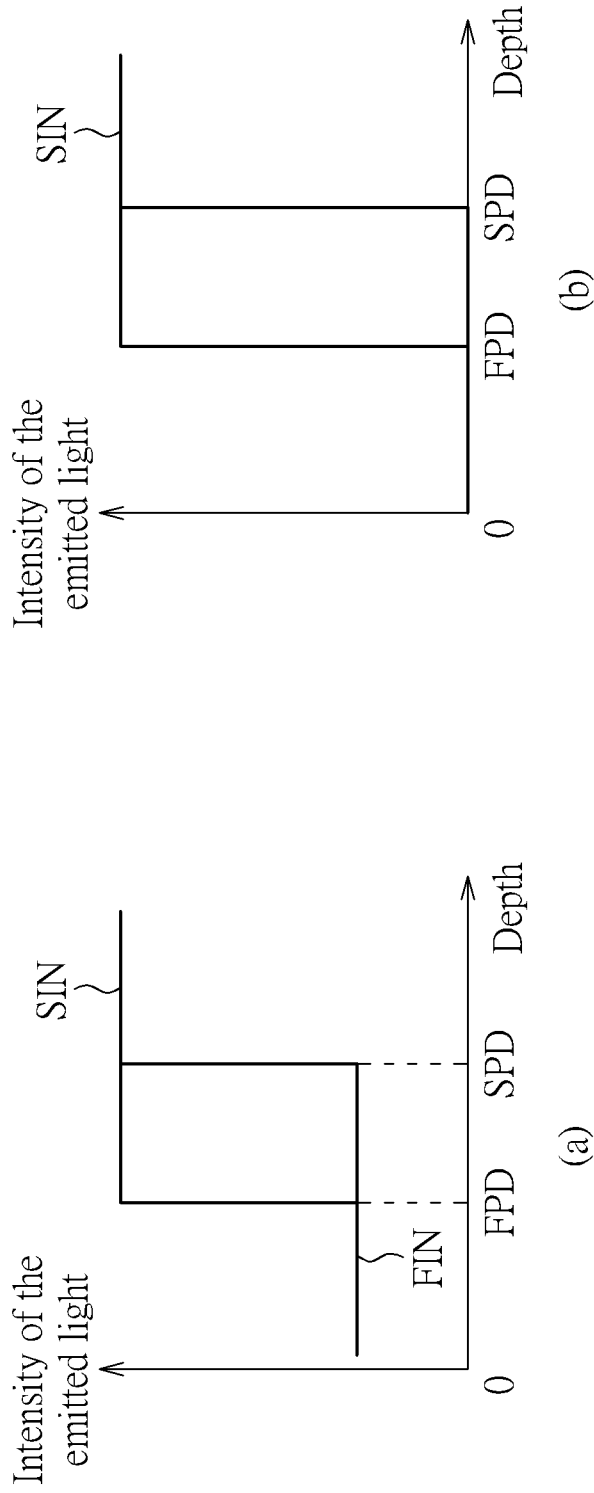
FIG. 3B is a diagram illustrating the controller controlling the intensity of the emitted light according to the depth corresponding to the object.

3A(a)-3A(c), the controller 108 can dynamically adjust the intensity of the emitted light according to the depth corresponding to the object 202. In addition, in another embodiment of the present invention, the controller 108 adjusts the intensity of the emitted light according to noisy level of at least one region of interest of the depth map DP. In addition, in another embodiment of the present invention, as shown in FIG. 3B (a), 3B (b), when the depth corresponding to the object 202 is less than a first predetermined depth FPD and the intensity of the emitted light is the second intensity SIN, the controller 108 adjusts the intensity of the emitted light from the second intensity SIN to the first intensity FIN (as shown in FIG. 3B (a)), or the controller 108 turns off the light source 102 (as shown in FIG. 3B (b)). In addition, when the depth corresponding to the object 202 is greater than a second predetermined depth SPD and the intensity of the emitted light is the first intensity FIN (as shown in FIG. 3B (a)), or when the depth corresponding to the object 202 is greater than the second predetermined depth SPD and the light source 102 is turned off (as shown in FIG. 3B (b)), the controller 108 adjusts the intensity of the emitted light from the first intensity FIN to the second intensity SIN (as shown in FIG. 3B (a)), or the controller 108 turns on the light source 102 and makes the intensity of the emitted light be the second intensity SIN (as shown in FIG. 3B (b)), wherein the first predetermined depth FPD is less than the second predetermined depth SPD.

In addition, in another embodiment of the present invention, the light source 102 is applied to a time of flight (TOF) camera. Therefore, the depth map generator 106 can generate the depth map DP corresponding to the image IM according to a difference in time between a receiving time for the image capturer 104 receiving reflected light and a generating time corresponding to the emitted light, wherein the reflected light is generated by the object 202 reflecting the emitted light. Meanwhile, operational principles of the controller 108 determining whether to adjust the intensity of the emitted light according to the depth of the depth map DP corresponding to the object 202 can be referred to the above-mentioned corresponding descriptions of FIG. 3A(a)-3A(c), so further description thereof is omitted for simplicity.

In addition, in another embodiment of the present invention, the controller 108 can dynamically adjust the intensity of the emitted light according to disparity of the depth map DP corresponding to the object 202. In addition, because the disparity corresponding to the object 202 is inversely proportional to the depth corresponding to the object 202, operational principles of the controller 108 can be realized by left and right reversing FIG. 3A(a)-3A(c), so further description thereof is omitted for simplicity.

In addition, in another embodiment of the present invention, after the depth map generator 106 generates the depth map DP, the controller 108 can determine whether to adjust the intensity of the emitted light according to a proportion corresponding to invalid data in the depth map DP or a proportion corresponding to noisy areas in the depth map DP. Because the object 202 is lighted by the emitted light when the light source 102 is turned on, the proportion should be smaller when the light source 102 is turned on. However, if the proportion is greater when the light source 102 is turned on, meanwhile it means that a distance between the object 202 and the depth generation system 100 is too close (beyond depth computing capability of the depth map generator 106) or too far (the light source 102 cannot effectively light the object 202). Therefore, FIG. 4A(a), when the proportion is greater than a predetermined proportion PR and the intensity of the emitted light is the second intensity SIN, the controller 108 adjusts the intensity of the emitted light from the second intensity SIN to the first intensity FIN to save power consumption of the depth generation system 100. That is, when the proportion is greater than the predetermined proportion PR and the intensity of the emitted light is the first intensity FIN, the controller 108 maintains the intensity of the emitted light at the first intensity FIN. In addition, when the proportion is less than the predetermined proportion PR, operational principles of the controller 108 can be referred to FIG. 4A(a), so further description thereof is omitted for simplicity. Therefore, as shown in FIG. 4A(a), the controller 108 can dynamically adjust the intensity of the emitted light according to the proportion.

Figure 4A:
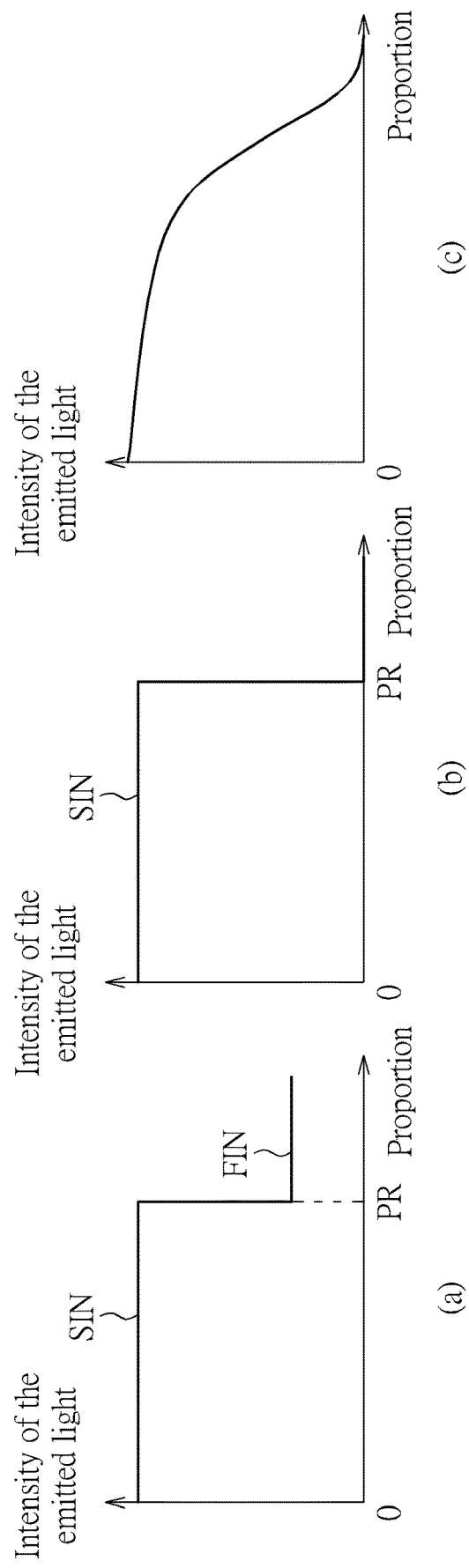
FIG. 4A is a diagram illustrating the controller controlling the intensity of the emitted light according to the proportion corresponding to invalid data in the depth map or the proportion corresponding to noisy areas in the depth map.
Figure 4B:
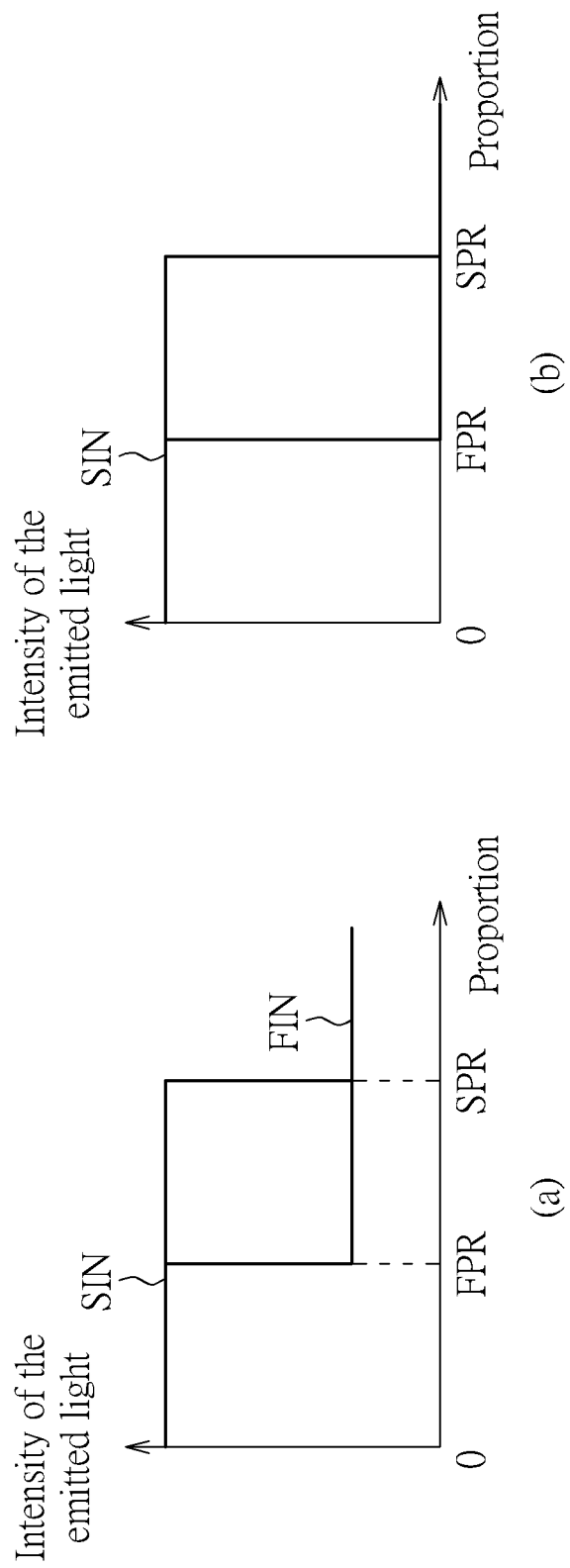
FIG. 4B is a diagram illustrating the controller controlling the intensity of the emitted light according to the proportion corresponding to invalid data in the depth map or the proportion corresponding to noisy areas in the depth map.

In addition, in another embodiment of the present invention, as shown in FIG. 4A(b), when the proportion is greater than the predetermined proportion PR and the light source 102 is turned off, the controller 108 maintains the light source 102 off. That is, when the proportion is greater than the predetermined proportion PR and the light source 102 is turned on (meanwhile, the intensity of the emitted light is the second intensity SIN), the controller 108 turns off the light source 102. In addition, as shown in FIG. 4A(b), when the proportion is less than the predetermined proportion PR and the light source 102 is turned off, the controller 108 turns on the light source 102 and makes the intensity of the emitted light be the second intensity SIN. That is, when the proportion is less than the predetermined proportion PR and the light source 102 is turned on (meanwhile, the intensity of the emitted light is the second intensity SIN), the controller 108 maintains the light source 102 on. In addition, after the predetermined time when the controller 108 turns off the light source 102, the controller 108 can turn on the light source 102 again and make the intensity of the emitted light be the second intensity SIN, if the proportion is less than the predetermined proportion PR, the controller 108 maintains the light source 102 on, and if the proportion is greater than the predetermined proportion PR, the controller 108 turns off the light source 102 again. In addition, in another embodiment of the present invention, as shown in FIG. 4A(c), after the controller 108 turns on the light source 102, the controller 108 gradually decreases the intensity of the emitted light in multiple steps, even if turns off the light source 102 with increase of the proportion, and gradually increases the intensity of the emitted light with decrease of the proportion in multiple steps. In addition, after the predetermined time when the controller 108 turns off the light source 102, the controller 108 can turn on the light source 102 again and make the intensity of the emitted light be the predetermined intensity. After the light source 102 is turned on, the controller 108 can adjust the intensity of the emitted light again according to the proportion. Therefore, as shown in FIG. 4A(a)-4A(c), the controller 108 can dynamically adjust the intensity of the emitted light according to the proportion. In addition, in another embodiment of the present invention, as shown in FIG. 4B(a), 4B(b), when the proportion is less than a first predetermined proportion FPR and the intensity of the emitted light is the first intensity FIN, the controller 108 adjusts the intensity of the emitted light from the first intensity FIN to the second intensity SIN (as shown in FIG. 4B(a)), or the controller 108 turns on the light source 102 and makes the intensity of the emitted light be the second intensity SIN (as shown in FIG. 4B(b)). When the proportion is greater than a second predetermined proportion SPR and the intensity of the emitted light is the second intensity SIN, the controller 108 adjusts the intensity of the emitted light from the second intensity SIN to the first intensity FIN (as shown in FIG. 4B(a)), or the controller 108 turns off the light source 102 (as shown in FIG. 4B(b)), wherein the first predetermined proportion FPR is less than the second predetermined proportion SPR.

In addition, in another embodiment of the present invention, the light source 102 is applied to the time of flight (TOF) camera. Therefore, the depth map generator 106 can generate the depth map DP corresponding to the image IM according to the difference in time between the receiving time for the image capturer 104 receiving the reflected light and the generating time corresponding to the emitted light. Meanwhile, operational principles of the controller 108 determining whether to adjust the intensity of the emitted light according to the proportion corresponding to the invalid data in the depth map DP can be referred to the above-mentioned corresponding descriptions of FIG. 4A(a)-4A(c), so further description thereof is omitted for simplicity.

Figure 5A:
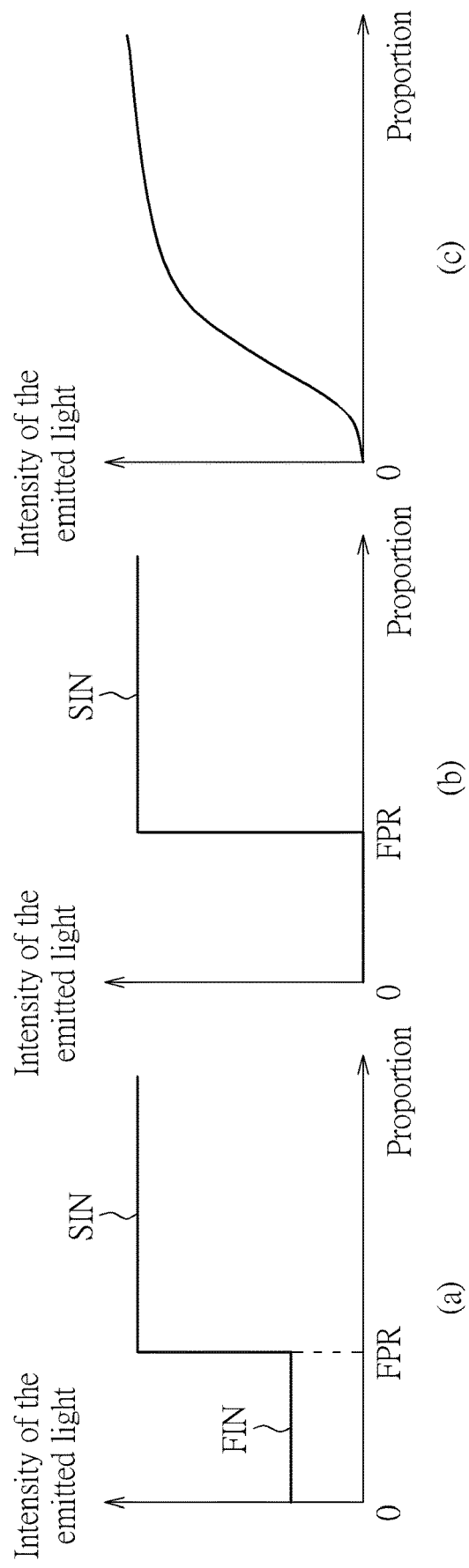
FIG. 5A is a diagram illustrating the controller controlling the intensity of the emitted light according to the proportion corresponding to invalid data in the depth map or the proportion corresponding to noisy areas in the depth map.
Figure 5B:
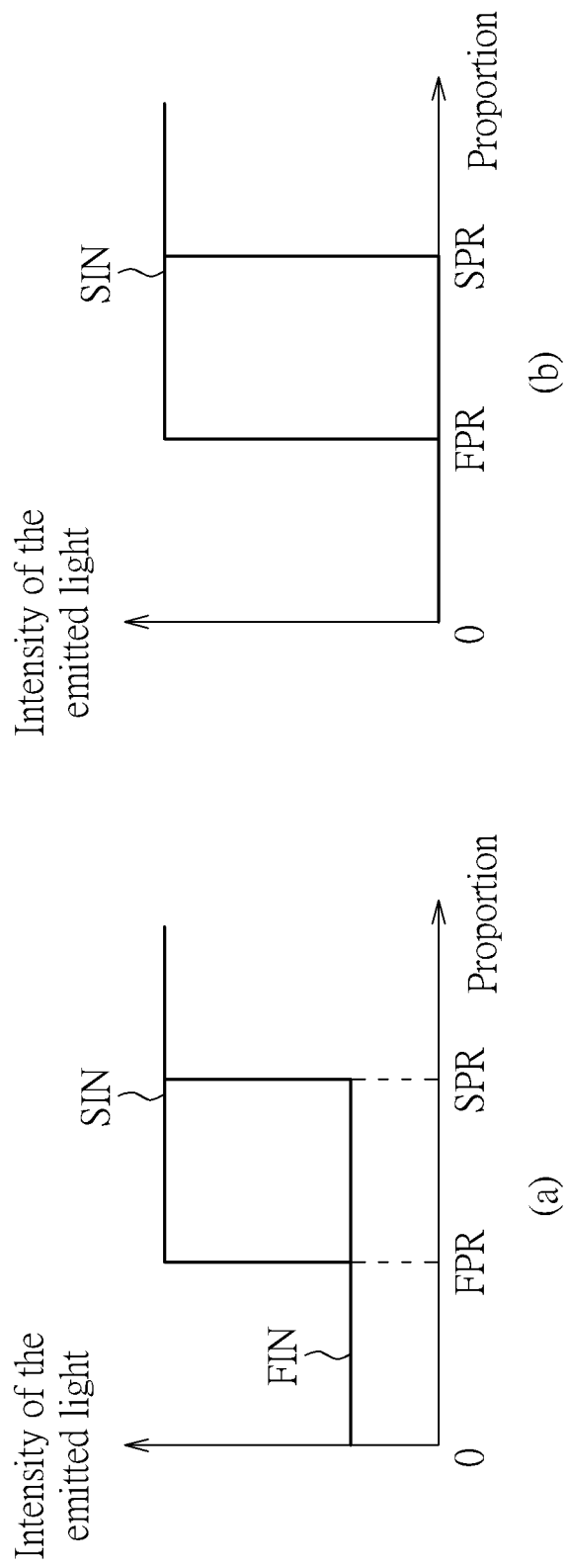
FIG. 5B is a diagram illustrating the controller controlling the intensity of the emitted light according to the proportion corresponding to invalid data in the depth map or the proportion corresponding to noisy areas in the depth map.

In addition, in another embodiment of the present invention, the depth generation system 100 includes two image capturers, and the two image capturers form a first stereo camera. When the light source 102 is not turned on, the two image capturers can still capture two images including the object 202, so the depth map generator 106 can still generate a depth map corresponding to the two images according to the two images. Therefore, when a proportion corresponding to invalid data in the depth map corresponding to the two images is smaller, it means that a current environment which the depth generation system 100 is located at is suitable for a binocular vision depth algorithm. Therefore, as shown in FIG. 5A(a), when the proportion corresponding to invalid data in the depth map corresponding to the two images is greater than the first predetermined proportion FPR and the intensity of the emitted light is the first intensity FIN, the controller 108 adjusts the intensity of the emitted light from the first intensity FIN to the second intensity SIN to increase quality of the depth map corresponding to the two images. That is, when the proportion corresponding to invalid data in the depth map corresponding to the two images is greater than the first predetermined proportion FPR and the intensity of the emitted light is the second intensity SIN, the controller 108 maintains the intensity of the emitted light at the second intensity SIN. In addition, when the proportion corresponding to invalid data in the depth map corresponding to the two images is less than the first predetermined proportion FPR, operational principles of the controller 108 can be referred to FIG. 5A(a), so further description thereof is omitted for simplicity. In addition, as shown in FIG. 5A(b), when the proportion corresponding to invalid data in the depth map corresponding to the two images is greater than the first predetermined proportion FPR and the light source 102 is turned off, the controller 108 turns on the light source 102 and makes the intensity of the emitted light be the second intensity SIN. That is, when the proportion corresponding to invalid data in the depth map corresponding to the two images is greater than the first predetermined proportion FPR and the light source 102 is turned on (meanwhile, the intensity of the emitted light is the second intensity SIN), the controller 108 maintains the light source 102 on. In addition, as shown in FIG. 5A(b), when the proportion corresponding to invalid data in the depth map corresponding to the two images is less than the first predetermined proportion FPR and the light source 102 is turned off, the controller 108 maintains the light source 102 off. That is, when the proportion corresponding to invalid data in the depth map corresponding to the two images is less than the first predetermined proportion FPR and the light source 102 is turned on (meanwhile, the intensity of the emitted light is the second intensity SIN), the controller 108 turns off the light source 102. In addition, after the predetermined time when the controller 108 turns off the light source 102, the controller 108 can turn on the light source 102 again and makes the intensity of the emitted light be the second intensity SIN, if the proportion corresponding to invalid data in the depth map corresponding to the two images is less than the first predetermined proportion FPR due to movement of the object 202, the controller 108 turns off the light source 102 again, and if the proportion corresponding to invalid data in the depth map corresponding to the two images is greater than the first predetermined proportion FPR due to movement of the object 202, the controller 108 maintains the light source 102 on. In addition, in another embodiment of the present invention, as shown in FIG. 5A(c), after the controller 108 turns on the light source 102, the controller 108 gradually increases the intensity of the emitted light with increase of the proportion corresponding to invalid data in the depth map corresponding to the two images in multiple steps, and gradually decreases the intensity of the emitted light in multiple steps, even if turns off the light source 102 with decrease of the proportion corresponding to invalid data in the depth map corresponding to the two images. In addition, after the predetermined time when the controller 108 turns off the light source 102, the controller 108 can turn on the light source 102 again and make the intensity of the emitted light be the predetermined intensity. After the light source 102 is turned on, the controller 108 adjusts the intensity of the emitted light again according to the proportion corresponding to invalid data in the depth map corresponding to the two images. Therefore, as shown in FIG. 5A(a)-5A(c), the controller 108 can dynamically adjust the intensity of the emitted light according to the proportion corresponding to invalid data in the depth map corresponding to the two images. In addition, in another embodiment of the present invention, as shown in FIG. 5B(a), 5B(b), when the proportion corresponding to invalid data in the depth map corresponding to the two images is less than the first predetermined proportion FPR and the intensity of the emitted light is the second intensity SIN, the controller 108 adjusts the intensity of the emitted light from the second intensity SIN to the first intensity FIN (as shown in FIG. 5B(a)), or the controller 108 turns off the light source 102 (as shown in FIG. 5B(b)). In addition, when the proportion corresponding to invalid data in the depth map corresponding to the two images is greater than the second predetermined proportion SPR and the intensity of the emitted light is the first intensity FIN (as shown in FIG. 5B(a)) or when the proportion corresponding to invalid data in the depth map corresponding to the two images is greater than the second predetermined proportion SPR and the light source 102 is turned off (as shown in FIG. 5B(b)), the controller 108 adjusts the intensity of the emitted light from the first intensity FIN to the second intensity SIN (as shown in FIG. 5B(a)), or the controller 108 turns on the light source 102 and makes the intensity of the emitted light be the second intensity SIN (as shown in FIG. 5B(b)).

Figure 6:
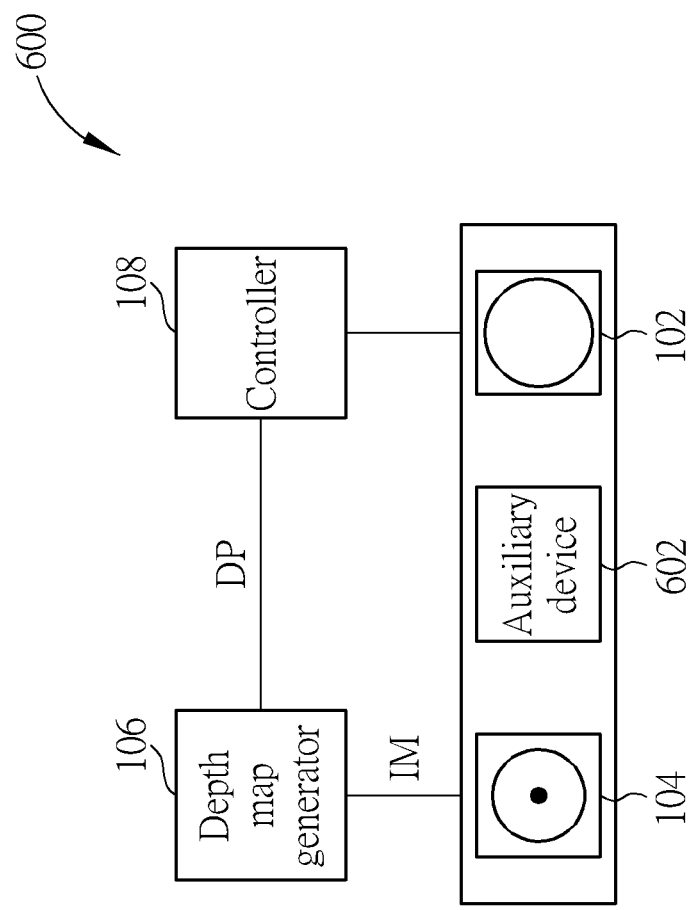
FIG. 6 is a diagram illustrating a depth generation system with adjustable light intensity according to a second embodiment of the present invention.

In addition, please refer to FIG. 6. FIG. 6 is a diagram illustrating a depth generation system 600 with adjustable light intensity according to a second embodiment of the present invention. As shown in FIG. 6, a difference between the depth generation system 600 and the depth generation system 100 is that the depth generation system 600 further includes an auxiliary device 602, wherein the auxiliary device 602 has a low power consumption characteristic and is not turned off by the controller 108. In addition, the auxiliary device 602 and the image capturer 104 form a second stereo camera, or the auxiliary device 602 and the image capturer 104 form a single point laser rangefinder. That is, the light source 102 and the image capturer 104 form a first depth generator, and the auxiliary device 602 and the image capturer 104 form a second depth generator (that is, the second stereo camera or the single point laser rangefinder). Therefore, because the auxiliary device 602 is not turned off by the controller 108, when the light source 102 is turned off by the controller 108, the auxiliary device 602 and the image capturer 104 can still determine the depth corresponding to the object 202. Therefore, as shown in FIG. 6, the controller 108 can control the light source 102 according to the depth corresponding to the object 202 determined by the first depth generator or the depth corresponding to the object 202 determined by the second depth generator, wherein operational principles of the controller 108 controlling the light source 102 can be referred to the above-mentioned corresponding descriptions of FIG. 3A(a)-3A(c), so further description thereof is omitted for simplicity.

Figure 7:
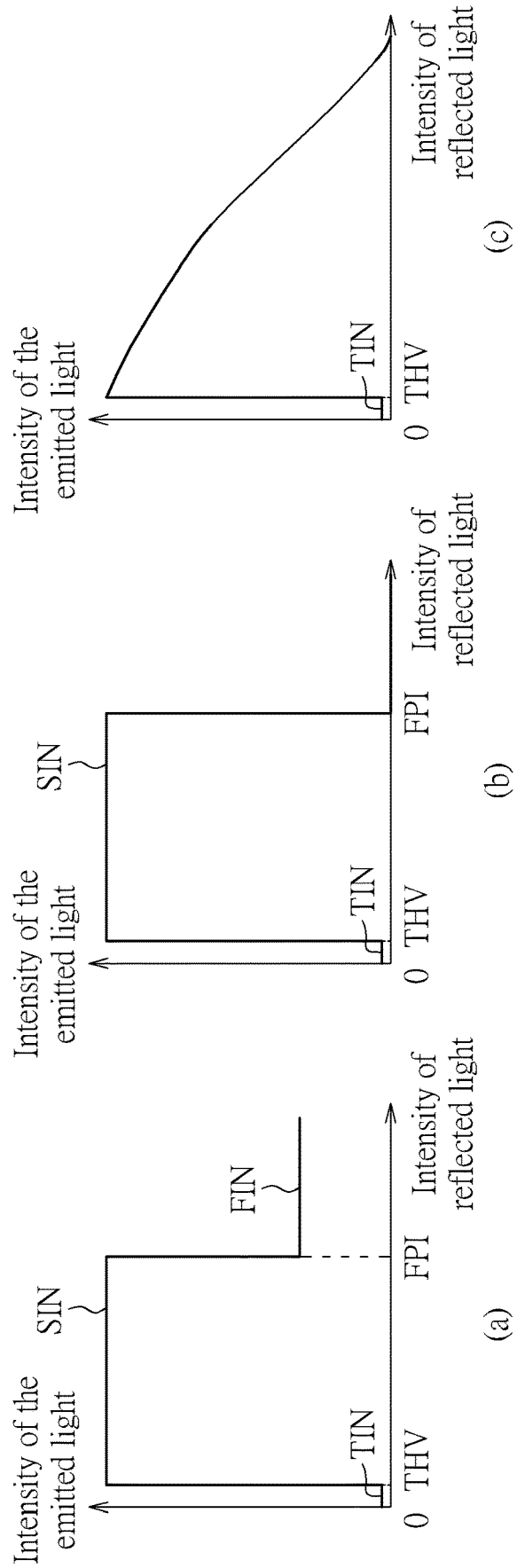
FIG. 7 is a diagram illustrating the controller controlling the intensity of the emitted light according to the intensity of the reflected light.

In addition, in another embodiment of the present invention, after the image capturer 104 generates the image IM, the controller 108 can determine whether to adjust the intensity of the emitted light according to intensity of reflected light generated by the object 202 (wherein the intensity of the reflected light is changed with the distance corresponding to the object 202). Therefore, as shown in FIG. 7(a), when the intensity of the reflected light generated by the object 202 is greater than the first predetermined intensity FPI and the intensity of the emitted light is the second intensity SIN, the controller 108 adjusts the intensity of the emitted light from the second intensity SIN to the first intensity FIN to make the reflected light generated by the object 202 not damage eyes of a user. That is, when the intensity of the reflected light is greater than the first predetermined intensity FPI and the intensity of the emitted light is the first intensity FIN, the controller 108 maintains the intensity of the emitted light at the first intensity FIN. In addition, when the intensity of the reflected light is less than the first predetermined intensity FPI, operational principles of the controller 108 can be referred to FIG. 7(a), so further description thereof is omitted for simplicity. In addition, as shown in FIG. 7(a), when the intensity of the reflected light is less than a threshold value THV, it means that a distance between the object 202 and the depth generation system 600 is too close so that the image capturer 104 cannot sense the reflected light generated by the object 202, or means that the light source 102 malfunctions (e.g. a diffraction component of the light source 102 looses), or means that distances between all objects in the image IM and the light source 102 are too far, resulting in maximum intensity of the emitted light also not making any object of the all objects reflect the emitted light. Therefore, when the intensity of the reflected light is less than the threshold value THV, the controller 108 will adjust the intensity of the emitted light to be third intensity TIN (wherein the third intensity TIN is usually much less than the first intensity FIN and the second intensity SIN), or the controller 108 turns off the light source 102.

In addition, in another embodiment of the present invention, as shown in FIG. 7(b), when the intensity of the reflected light is greater than the first predetermined intensity FPI and the light source 102 is turned off, the controller 108 maintains the light source 102 off. That is, when the intensity of the reflected light is greater than the first predetermined intensity FPI and the light source 102 is turned on (meanwhile, the intensity of the emitted light is the second intensity SIN), the controller 108 turns off the light source 102. In addition, as shown in FIG. 7(b), when the intensity of the reflected light is less than the first predetermined intensity FPI and the light source 102 is turned off, the controller 108 turns on the light source 102 and makes the intensity of the emitted light be the second intensity SIN. That is, when the intensity of the reflected light is less than the first predetermined intensity FPI and the light source 102 is turned on (meanwhile, the intensity of the emitted light is the second intensity SIN), the controller 108 maintains the light source 102 on. In addition, after the predetermined time when the controller 108 turns off the light source 102, the controller 108 can turn on the light source 102 again and make the intensity of the emitted light be the second intensity SIN, if the intensity of the reflected light is less than the first predetermined intensity FPI due to movement of the object 202, the controller 108 maintains the light source 102 on, and if the intensity of the reflected light is greater than the first predetermined intensity FPI due to movement of the object 202, the controller 108 turns off the light source 102 again. In addition, as shown in FIG. 7(b), when the intensity of the reflected light is less than the threshold value THV, the controller 108 can adjust the intensity of the emitted light to be the third intensity TIN or turn off the light source 102. In addition, operational principles after the light source 102 is turned off can be referred to the corresponding descriptions of FIG. 7(b), so further description thereof is omitted for simplicity. In addition, in another embodiment of the present invention, as shown in FIG. 7(c), after the controller 108 turns on the light source 102, the controller 108 gradually decrease the intensity of the emitted light with increase of the intensity of the reflected light in multiple steps, and gradually increases the intensity of the emitted light with decrease of the intensity of the reflected light in multiple steps. In addition, as shown in FIG. 7(c), when the intensity of the reflected light is less than the threshold value THV, the controller 108 will adjust the intensity of the emitted light to be the third intensity TIN or turn off the light source 102, wherein the third intensity TIN is usually much less than the first intensity FIN and the second intensity SIN. In addition, operational principles after the light source 102 is turned off can be referred to the corresponding descriptions of FIG. 7(c), so further description thereof is omitted for simplicity. Therefore, as shown in FIG. 7(a)-7(c), the controller 108 can dynamically adjust the intensity of the emitted light according to the intensity of the reflected light.

Figure 8:
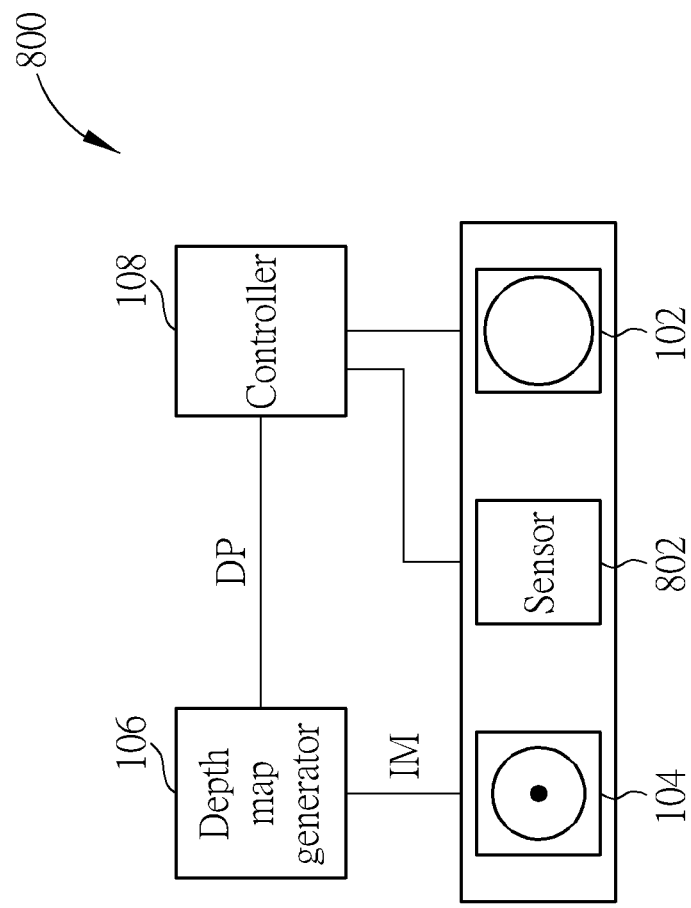
FIG. 8 is a diagram illustrating a depth generation system with adjustable light intensity according to a third embodiment of the present invention.
Figure 9:
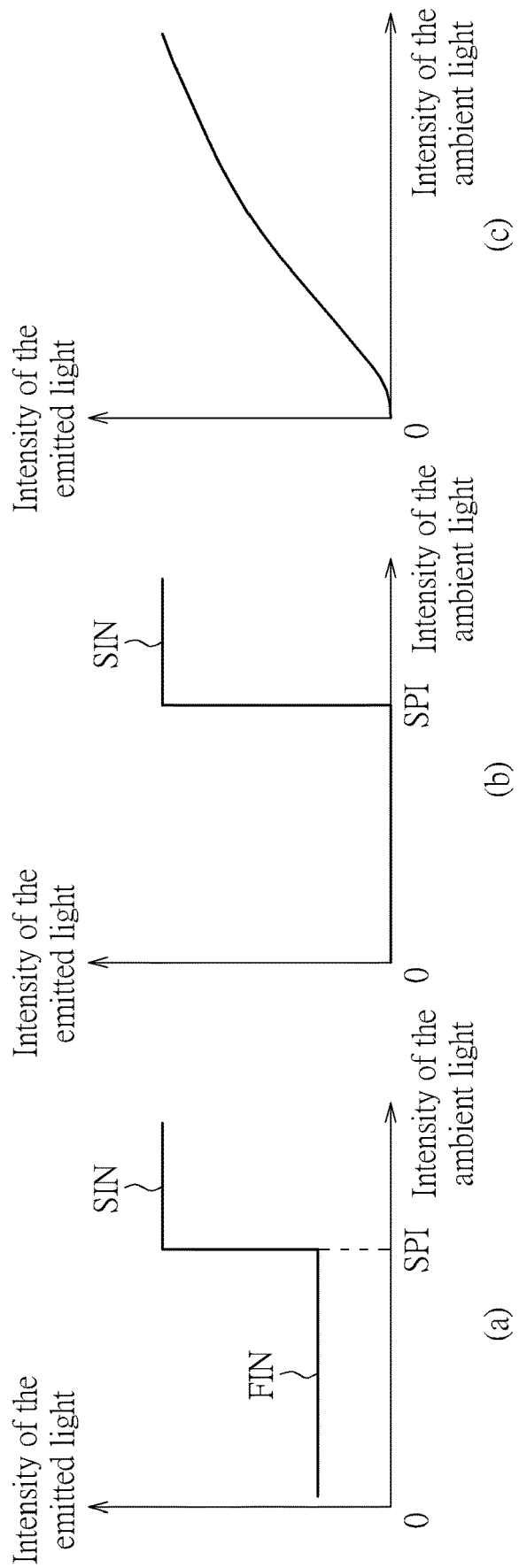
FIG. 9 is a diagram illustrating the controller controlling the intensity of the emitted light according to the intensity of the ambient light.

In addition, please refer to FIG. 8. FIG. 8 is a diagram illustrating a depth generation system 800 with adjustable light intensity according to a third embodiment of the present invention. As shown in FIG. 8, a difference between the depth generation system 800 and the depth generation system 100 is that the depth generation system 800 further includes a sensor 802, wherein the sensor 802 is used for sensing ambient light of an environment which the depth generation system 800 is located at, and the sensor 802 can be an RGB sensor or other type light sensors. Therefore, as shown in FIG. 9(a), when intensity of the ambient light is greater than the second predetermined intensity SPI and the intensity of the emitted light is the first intensity FIN, the controller 108 adjusts the intensity of the emitted light from the first intensity FIN to the second intensity SIN. That is, when the intensity of the ambient light is greater than the second predetermined intensity SPI and the intensity of the emitted light is the second intensity SIN, the controller 108 maintains the intensity of the emitted light at the second intensity SIN. In addition, when the intensity of the ambient light is less than the second predetermined intensity SPI, operational principles of the controller 108 can be referred to FIG. 9(a), so further description thereof is omitted for simplicity.

In addition, in another embodiment of the present invention, as shown in FIG. 9(b), when the intensity of the ambient light is greater than the second the predetermined intensity SPI and the light source 102 is turned off, the controller 108 turns on the light source 102 and makes the intensity of the emitted light be the second intensity SIN. That is, when the intensity of the ambient light is greater than the second predetermined intensity SPI and the light source 102 is turned on (meanwhile, the intensity of the emitted light is the second intensity SIN), the controller 108 maintains the intensity of the emitted light at the second intensity SIN. In addition, as shown in FIG. 9(b), when the intensity of the ambient light is less than the second predetermined intensity SPI and the light source 102 is turned off, the controller 108 maintains the light source 102 off. That is, when the intensity of the ambient light is less than the second predetermined intensity SPI and the light source 102 is turned on (meanwhile, the intensity of the emitted light is the second intensity SIN), the controller 108 turns off the light source 102. In addition, after the predetermined time when the controller 108 turns off the light source 102, the controller 108 can turn on the light source 102 again and make the intensity of the emitted light be the second intensity SIN, if the intensity of the ambient light is greater than the second predetermined intensity SPI, the controller 108 maintains the light source 102 on, and if the intensity of the ambient light is less than the second predetermined intensity SPI, the controller 108 turns off the light source 102 again. In addition, in another embodiment of the present invention, as shown in FIG. 9(c), after the controller 108 turns on the light source 102, the controller 108 gradually increases the intensity of the emitted light with increase of the intensity of the ambient light in multiple steps, and gradually decreases the intensity of the emitted light in multiple steps, even if turns off the light source 102 with decrease of the intensity of the ambient light. In addition, after the predetermined time when the controller 108 turns off the light source 102, the controller 108 can turn on the light source 102 again and make the intensity of the emitted light be the predetermined intensity. After the light source 102 is turned on again, the controller 108 adjusts the intensity of the emitted light again according to the intensity of the ambient light. Therefore, as shown in FIG. 9(a)-9(c), the controller 108 can dynamically adjust the light source 102 according to the intensity of the ambient light. In addition, because a state of the sensor 802 is in direct proportion to the intensity of the ambient light, and a definition of the state is that luminance of the image IM is divided by a product of a size of an aperture, an exposure time (or a shutter time), and an ISO (International Organization for Standardization) gain of the sensor 802, in another embodiment of the present invention, the controller 108 can dynamically adjust the light source 102 according to the state of the sensor 802.

In addition, in another embodiment of the present invention, the light source 102 is applied to the time of flight camera, so operational principles of the controller 108 determining whether to adjust the intensity of the emitted light according to the intensity of the ambient light can be referred to the above-mentioned corresponding descriptions of FIG. 9(a)-9(c), so further description thereof is omitted for simplicity.

In addition, in another embodiment of the present invention, the image capturer 104 can substitute for the sensor 802. That is, the image capturer 104 not only can capture the image IM, but can also sense the intensity of the ambient light, and meanwhile the above-mentioned operations of the sensor 802 are executed by the image capturer 104.

Figure 10:
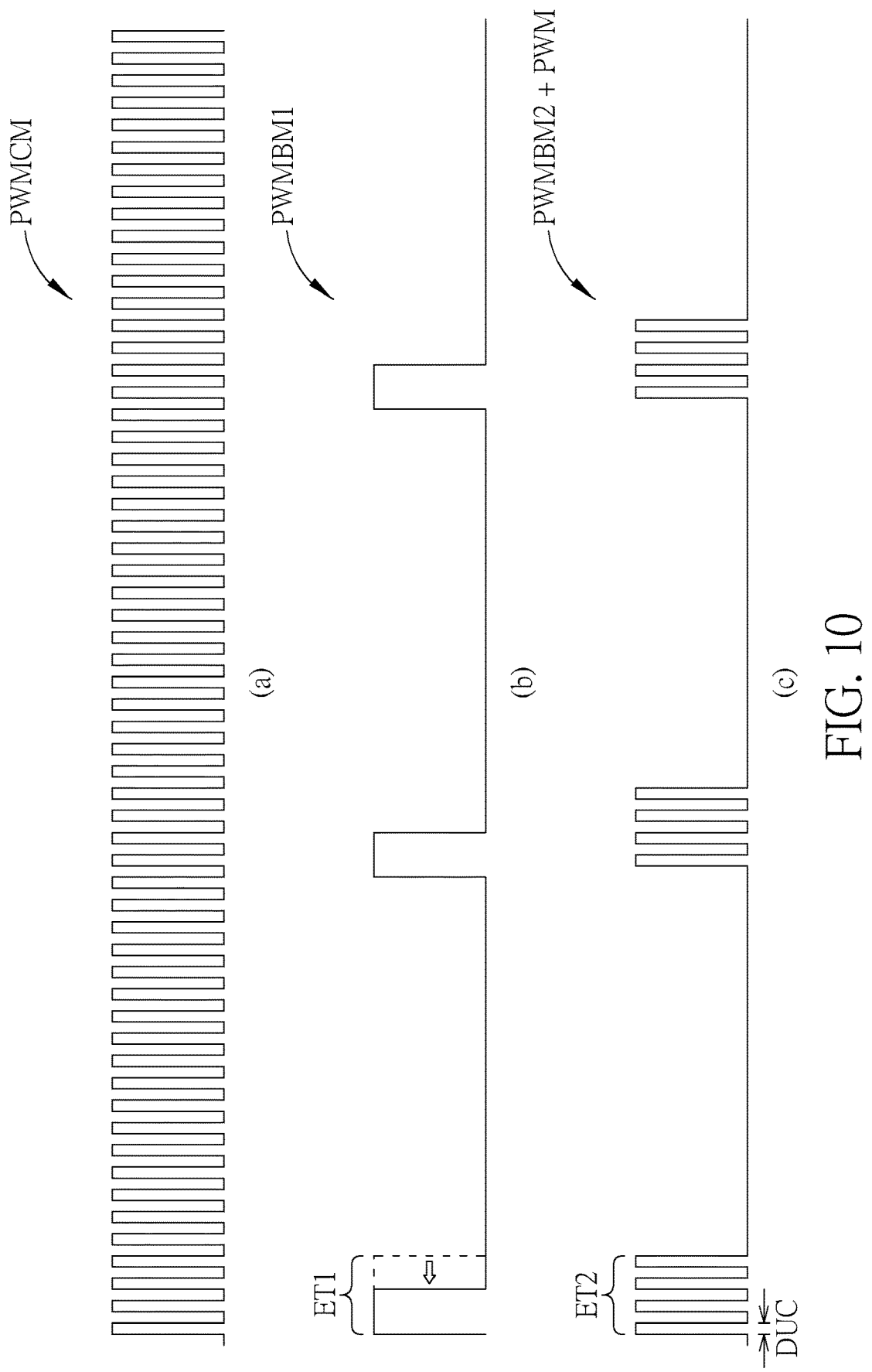
FIG. 10 is a diagram illustrating the controller utilizing the pulse width modulation signal to control the intensity of the emitted light.

In addition, as shown in FIG. 10(a), in the above-mentioned embodiments, when the controller 108 utilizes a pulse width modulation signal PWMCM in a continuous mode to adjust the intensity of the emitted light, the controller 108 can adjust the intensity of the emitted light by changing a duty cycle of the pulse width modulation signal PWMCM; as shown in FIG. 10(b), in the above-mentioned embodiments, when the controller 108 utilizes a pulse width modulation signal PWMBM1 in a burst mode to adjust the intensity of the emitted light, the controller 108 can adjust the intensity of the emitted light by changing an enabling time ET1 of the pulse width modulation signal PWMBM1; as shown in FIG. 10(c), in the above-mentioned embodiments, when the controller 108 utilizes a pulse width modulation signal PWMBM2 and a pulse width modulation signal PWM in a burst mode to adjust the intensity of the emitted light, the controller 108 can adjust the intensity of the emitted light by simultaneously changing an enabling time ET2 of the pulse width modulation signal PWMBM2 and a duty cycle DUC of the pulse width modulation signal PWM.

In addition, in another embodiment of the present invention, the controller 108 can determine whether to adjust the intensity of the emitted light according to smoothness of edges of a plurality of blocks included in the image IM. That is, the controller 108 can decrease the intensity of the emitted light with increase of the smoothness of the edges of the plurality of blocks.

In addition, in another embodiment of the present invention, the controller 108 can determine whether to adjust the intensity of the emitted light according to determining conditions of at least one embodiment of the above-mentioned embodiments.

Figure 11:
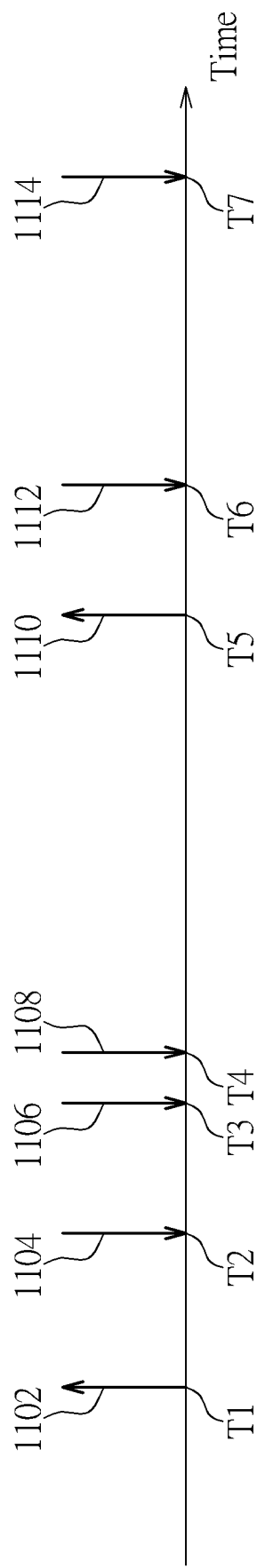
FIG. 11 is a diagram illustrating the corresponding image capturer only responding the structured light generated by the each light source.

In addition, in another embodiment of the present invention, a depth generation system includes a plurality of light sources and a plurality of image capturers (or a plurality of time of flight cameras, wherein each time of flight camera includes a light source and an image capturer), wherein emitted light generated by each light source of the plurality of light sources has a corresponding pattern (that is, patterns corresponding to a plurality of emitted lights generated by the plurality of light sources are different each other) or a corresponding frequency (or phase), and an image capturer corresponding to the each light source only responds the emitted light generated by the each light source. For example, as shown in FIG. 11, a first light source of the plurality of light sources generates first emitted light 1102 at a time T1, and a first image capturer corresponding to the first light source receives light 1104, light 1106, light 1108 at a time T2, a time T3, a time T4, respectively. However, because only the light 1106 corresponds to reflected light of the first emitted light 1102, the first image capturer only executes corresponding processes on the light 1106, and neglects the light 1104 and the light 1108, wherein the light 1104 and the light 1108 are generated by light sources of the plurality of light sources different from the first light source or ambient light. Further, as shown in FIG. 11, the first light source generates first emitted light 1110 at a time T5, and the first image capturer receives light 1112 and light 1114 at a time T6 and a time T7, respectively. However, because only the light 1114 corresponds to reflected light of the first emitted light 1110, the first image capturer only executes corresponding processes on the 1114, and neglects the light 1112, wherein the light 1112 is generated by a light source of the plurality of light sources different from the first light source or ambient light. In addition, the corresponding pattern of the emitted light generated by the each light source includes predetermined shapes, predetermined features, predetermined spatial frequencies, or predetermined spatial phases, wherein the predetermined shapes, the predetermined features, the predetermined spatial frequencies, and the predetermined spatial phases are easy to recognize. In addition, subsequent operational principles and features of the each light source can be referred to those of light source 102, so further description thereof is omitted for simplicity.

Figure 12:
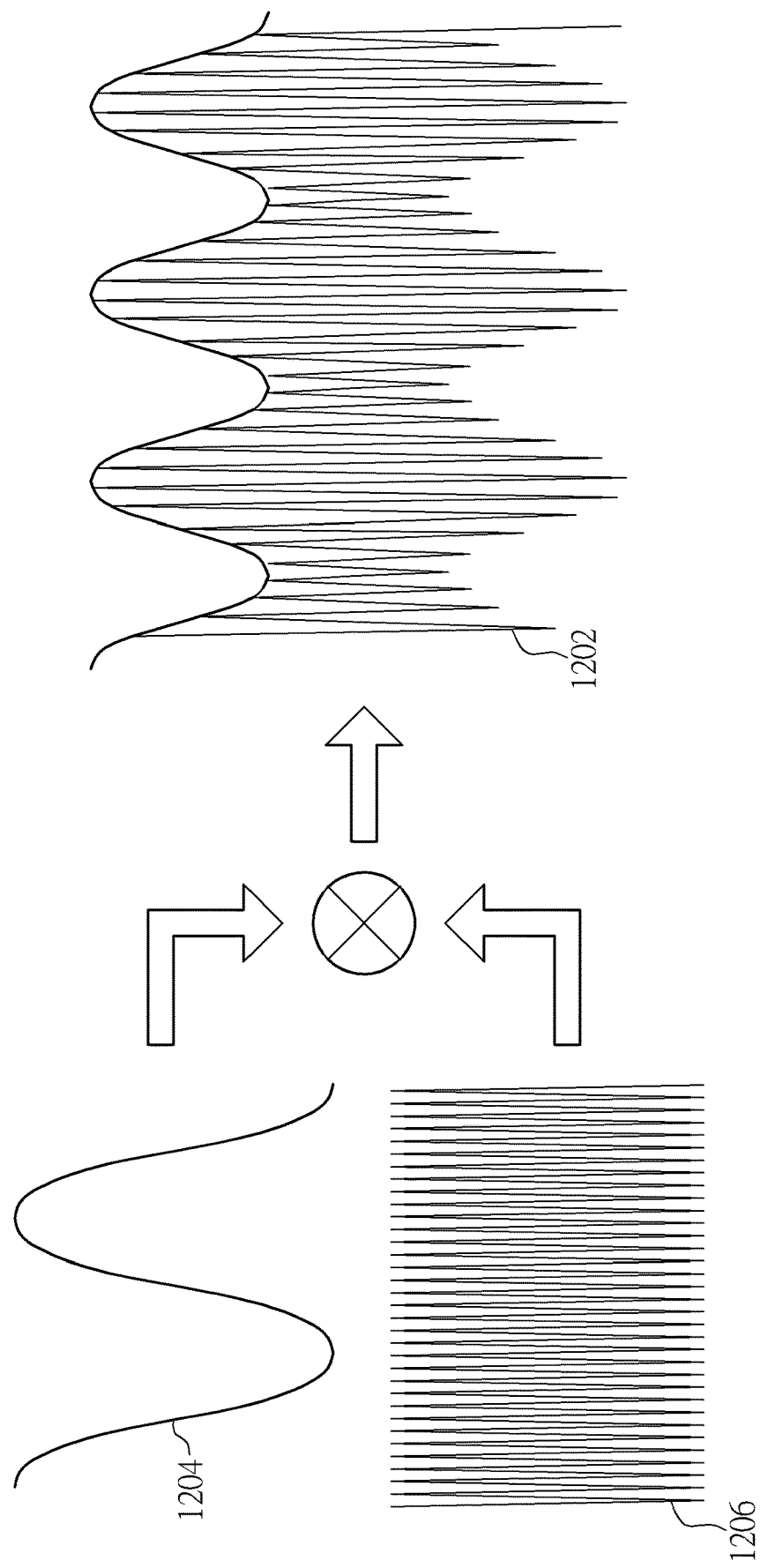
FIG. 12 is a diagram illustrating the emitted light being generated by the modulation signal modulating the original light in a time domain.

In addition, in another embodiment of the present invention, a depth generation system includes a plurality of light sources and a plurality of image capturers (or a plurality of time of flight cameras, wherein each time of flight camera includes a light source and an image capturer). Each light source of the plurality of light sources is used for generating emitted light 1202 (as shown in FIG. 12), wherein the emitted light 1202 is generated by a modulation signal 1206 modulating original light 1204 in a time domain, and the modulation signal 1206 has a corresponding modulating frequency. That is, when an image capturer corresponding to the each light source receives reflected light corresponding to the emitted light 1202, the image capturer corresponding to the each light source needs to demodulate the reflected light corresponding to the emitted light 1202 to obtain the original light 1204 according to the corresponding modulating frequency. Therefore, a plurality of structure lights generated by the plurality of light sources do not interfere each other. In addition, subsequent operational principles and features of the each light source can be referred to those of light source 102, so further description thereof is omitted for simplicity.

Figure 13:
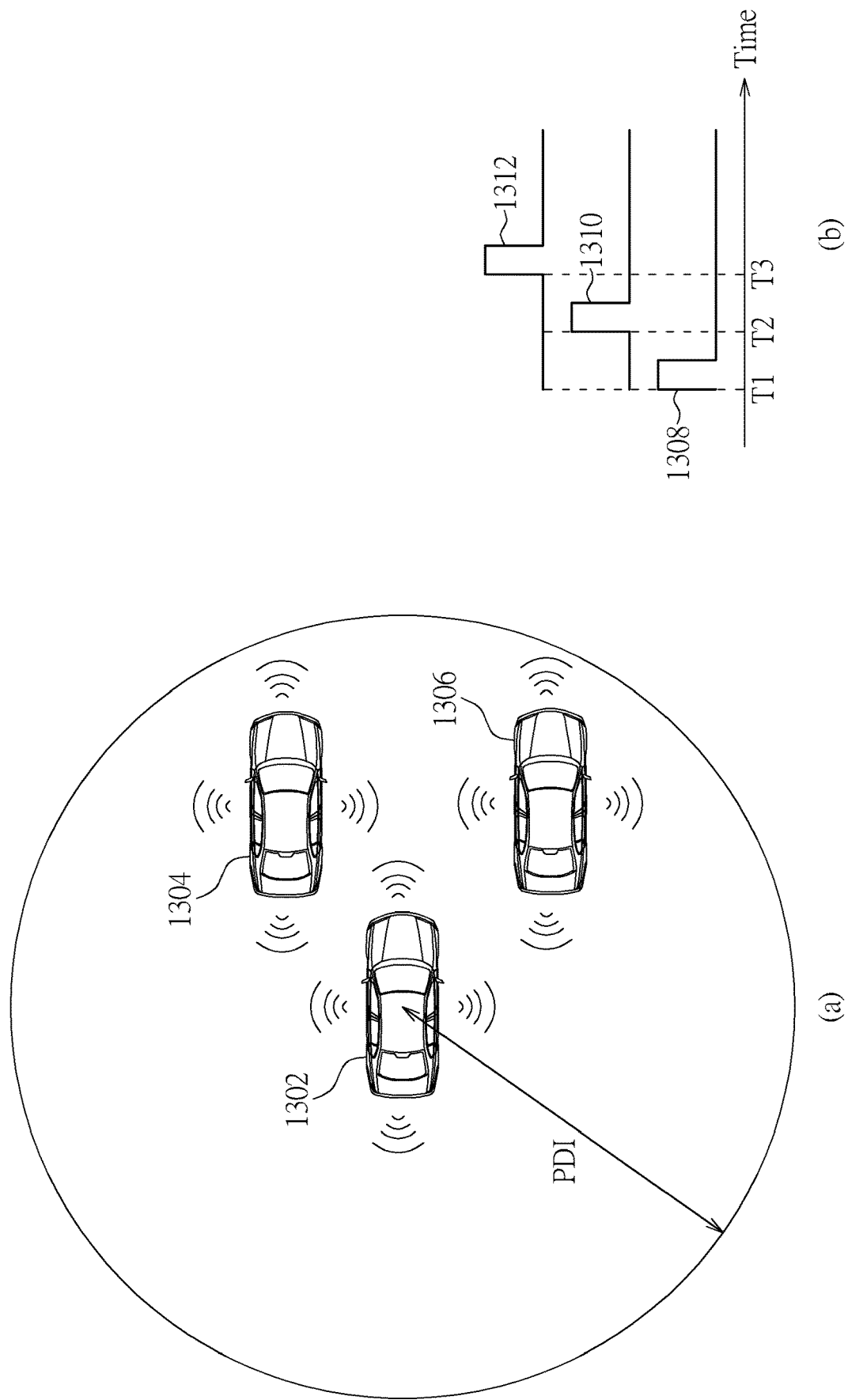
FIG. 13 is a diagram illustrating the plurality of cars being away from a can within the predetermined distance, and the plurality of cars according to the predetermined communication protocol, determining a time for a light source of a depth generation system of each car of the plurality of cars generating emitted light.

In addition, in another embodiment of the present invention, each depth generation system of a plurality of depth generation systems is applied to a mobile tool. For example, as shown in FIG. 13(*a*), each car of cars 1302, 1304, 1306 has a depth generation system, the cars 1304, 1306 are away from the car 1302 within a predetermined distance PDI, and a difference between the depth generation system and the depth generation system 100 is that the depth generation system further includes a wireless communication module. Therefore, as shown in FIG. 13(*a*), the car 1302 can utilize the wireless communication module and a predetermined communication protocol to communicate with the cars 1304, 1306. That is, when the car 1302 utilizes the wireless communication module and the predetermined communication protocol to communicate with the cars 1304, 1306, the cars 1302, 1304, 1306 can determine a time for a light source of a depth generation system of each car of the cars 1302, 1304, 1306 generating emitted light according to the predetermined communication protocol to prevent light sources of depth generation systems of the cars 1302, 1304, 1306 from generating emitted lights within the predetermined time. For example, as shown in FIG. 13(*b*), at a time T1, the light source of the depth generation system of the car 1302 generates emitted light 1308, at a time T2, the light source of the depth generation system of the car 1304 generates emitted light 1310, and at a time T3, the light source of the depth generation system of the car 1306 generates emitted light 1312. In addition, an interval between a time for a light source of a depth generation system of each car generating first emitted light and a time for a light source of a depth generation system of another car generating second emitted light needs to be greater than a maximum reflected time corresponding to the first emitted light to ensure that each car of the cars 1302, 1304, 1306 does not receive emitted light generated by another car. In addition, subsequent operational principles of the depth generation system can be referred to those of the depth generation system 100, so further description thereof is omitted for simplicity.

In addition, in another embodiment of the present invention, when the car 1302 utilizes the wireless communication module and the predetermined communication protocol to communicate with the cars 1304, 1306, the cars 1302, 1304, 1306 can determine at least one of a modulation frequency, a phase, and a pattern of emitted light generated by a light source of a depth generation system of each car of the cars 1302, 1304, 1306 according to the predetermined communication protocol to prevent the light sources of the depth generation systems of the cars 1302, 1304, 1306 from simultaneously generating emitted lights with an identical modulation frequency, phase, or pattern.

In addition, in another embodiment of the present invention, when the cars 1304, 1306 are away from the car 1302 within the predetermined distance PDI (as shown in FIG. 13(*a*)), the car 1302 can utilize the wireless communication module and the predetermined communication protocol to communicate with the cars 1304, 1306. That is, when the car 1302 utilizes the wireless communication module and the predetermined communication protocol to communicate with the cars 1304, 1306, the cars 1302, 1304, 1306 can determine a wavelength of emitted light generated by a light source of a depth generation system of each car of the cars 1302, 1304, 1306 according to the predetermined communication protocol. That is, wavelengths of emitted lights generated by the light sources of the depth generation systems of the car 1302, 1304, 1306 are different each other. For example, emitted light generated by the light source of the depth generation system of the car 1302 has a first wavelength, emitted light generated by the light source of the depth generation system of the car 1304 has a second wavelength, and emitted light generated by the light source of the depth generation system of the car 1306 has a third wavelength. Therefore, when the depth generation system of the car 1302 receives reflected light with the second wavelength and reflected light with the third wavelength, the depth generation system of the car 1302 does not have a corresponding response.

In addition, one of ordinary skill in the art should clearly realize functions of the depth map generator 106 through the above-mentioned corresponding descriptions of the depth map generator 106, so one of ordinary skill in the art can implement the depth map generator 106 through a field programmable gate array (FPGA) with the above-mentioned functions of the depth map generator 106, or an application-specific integrated circuit (ASIC) with the above-mentioned functions of the depth map generator 106, or a software module with the above-mentioned functions of the depth map generator 106. Therefore, further description of a corresponding structure of the depth map generator 106 is omitted for simplicity. Similarly, because one of ordinary skill in the art can also clearly realize functions of the controller 108 through the above-mentioned corresponding descriptions of the controller 108, so further description of a corresponding structure of the controller 108 is also omitted for simplicity.

To sum up, because the depth generation system utilizes the controller to dynamically adjust the intensity of the emitted light generated by the depth generation system according to at least one of the at least one depth of the depth map corresponding to the at least one object, the proportion of the invalid data of the depth map, the intensity of the at least one reflected light generated by the at least one object, and the intensity of the ambient light of the environment which the depth generation system is located at, compared to the prior art, the present invention can effectively prevent the eyes of the user from being damaged, increase the quality of the depth map, and reduce the power consumption of the depth generation system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A depth generation system with adjustable light intensity, the depth generation system comprising:
    at least one light source, wherein each light source generates emitted light;
    at least one image capturer, wherein each image capturer captures an image corresponding to the emitted light;
    a depth map generator coupled to the each image capturer for generating a corresponding depth map according to the image; and
    a controller coupled to the depth map generator for determining whether to adjust intensity of the emitted light according to a proportion of invalid data in the corresponding depth map.

2. The depth generation system of claim 1, wherein the controller determines whether to adjust the intensity of the emitted light according to at least one depth of the corresponding depth map, wherein the at least one depth corresponds to at least one object, and the at least one depth is changed with a distance corresponding to the at least one object.

3. The depth generation system of claim 2, wherein when the at least one depth is greater than a predetermined depth, the controller adjusts the intensity of the emitted light from first intensity to second intensity, and the second intensity is greater than the first intensity.

4. The depth generation system of claim 2, wherein when the at least one depth is greater than a predetermined depth, the controller turns on the each light source at second intensity.

5. The depth generation system of claim 2, wherein after a predetermined time when the controller turns off the each light source according to the at least one depth, the controller turns on the each light source and makes the emitted light be at second intensity, if the at least one depth corresponds to the at least one object is greater than a predetermined depth, the controller maintains the each light source on, and if the at least one depth is less than the predetermined depth, the controller turns off the each light source again.

6. The depth generation system of claim 2, wherein the controller adjusts the intensity of the emitted light in multiple steps according to the at least one depth of the corresponding depth map.

7. The depth generation system of claim 1, further comprising:
    an auxiliary device, wherein the auxiliary device and an image capturer of the at least one image capturer are used for detecting at least one depth of the corresponding depth map, the at least one depth corresponds to at least one object, the auxiliary device is not comprised in the at least one image capturer, and the auxiliary device is not turned off.

8. The depth generation system of claim 7, wherein the auxiliary device and the image capturer form a stereo camera, or the auxiliary device and the image capturer form a single point laser rangefinder.

9. The depth generation system of claim 1, wherein the controller determines whether to adjust the intensity of the emitted light according to information of the corresponding depth map and intensity of at least one reflected light generated by at least one object reflecting the emitted light.

10. The depth generation system of claim 1, wherein when the proportion is greater than a predetermined proportion, the controller adjusts the intensity of the emitted light from second intensity to first intensity, and the second intensity is greater than the first intensity.

11. The depth generation system of claim 1, wherein when the proportion is greater than a predetermined proportion, the controller turns off the each light source.

12. The depth generation system of claim 1, wherein after a predetermined time when the controller turns off the each light source according to the proportion, the controller turns on the each light source again and makes the emitted light be at second intensity, if the proportion is still greater than a predetermined proportion, the controller turns off the each light source again, and if the proportion is less than the predetermined proportion, the controller maintains the each light source on.

13. The depth generation system of claim 1, wherein the controller adjusts the intensity of the emitted light in multiple steps according to the proportion.

14. The depth generation system of claim 1, wherein the controller utilizes at least one pulse width modulation signal to adjust the intensity of the emitted light.

15. The depth generation system of claim 1, further comprising:
    a sensor sensing ambient light of an environment which the depth generation system is located at, wherein the controller determines whether to adjust the intensity of the emitted light further according to intensity of the ambient light.

16. The depth generation system of claim 1, wherein the emitted light has a corresponding pattern, or a corresponding frequency or phase, and an image capturer corresponding to the each light source receives the emitted light according to the corresponding pattern, or the corresponding frequency or phase.

17. The depth generation system of claim 1, wherein the emitted light is generated by a modulation signal modulating original light in a time domain, and an image capturer corresponding to the each light source demodulates reflected light corresponding to the emitted light to obtain the original light according to a corresponding modulating frequency.

18. The depth generation system of claim 1, wherein the emitted light has a corresponding wavelength, and an image capturer corresponding to the each light source receives the emitted light according to the corresponding wavelength.

19. A depth generation system with adjustable light intensity, the depth generation system comprising:
    at least one light source, wherein each light source generates emitted light;
    at least one image capturer, wherein each image capturer captures an image comprising at least one reflected light generated by at least one object reflecting the emitted light;
    a wireless communication module;
    a depth map generator coupled to the each image capturer for generating a corresponding depth map according to the image or the at least one reflected light; and a controller coupled to the depth map generator, wherein the controller determines at least one of an emitting time, a modulation frequency, a phase, and a pattern of the emitted light accordingly after the controller communicates with another depth generation system through the wireless communication module and a predetermined communication protocol.

20. A depth generation system with adjustable light intensity, the depth generation system comprising:
  at least one light source, wherein each light source generates emitted light;
  at least one image capturer, wherein each image capturer captures an image corresponding to the emitted light;
  a depth map generator coupled to the each image capturer for generating a corresponding depth map according to the image; and
  a controller coupled to the depth map generator for adaptively adjusting intensity of the emitted light according to intensity of at least one reflected light corresponding to the image;
  wherein when the intensity of the at least one reflected light is greater than a threshold value, the controller reduces the intensity of the emitted light or turn off the at least one light source.

* * * * *